United States Patent [19]

Kaneko et al.

[11] Patent Number: 4,623,791

[45] Date of Patent: Nov. 18, 1986

[54] OPTICAL SCANNING DEVICE

[75] Inventors: Yutaka Kaneko, Yokohama; Hiroyoshi Funato, Chigasaki, both of Japan

[73] Assignee: Ricoh Company, Ltd., Tokyo, Japan

[21] Appl. No.: 701,525

[22] Filed: Feb. 14, 1985

[30] Foreign Application Priority Data

Feb. 17, 1984 [JP] Japan ................................. 59-28071

[51] Int. Cl.⁴ ............................................... H01J 3/14
[52] U.S. Cl. ..................................... 250/234; 350/3.71
[58] Field of Search ................... 350/3.7, 3.71, 162.17, 350/6.2; 250/216, 234, 235, 236, 550, 237 G

[56] References Cited

U.S. PATENT DOCUMENTS 4,505,537  3/1985  Funato ...................... 350/3.71

Primary Examiner—David C. Nelms
Attorney, Agent, or Firm—Oblon, Fisher, Spivak, McClelland & Maier

[57] ABSTRACT

An optical scanning device includes a grating disc for deflection which is provided with linear diffraction gratings in an annular arrangement and adapted to deflect a laser beam to optically scan a given plane by means of the deflected laser beam. The laser beam incident to the grating disc has an elliptical section in its incident position on the grating disc. The longer axis of the elliptical section extends in the radial direction of the grating disc.

6 Claims, 11 Drawing Figures

OPTICAL SCANNING DEVICE

BACKGROUND OF THE INVENTION

The present invention relates to an optical scanning device in which a grating disc provided with a plurality of linear diffraction gratings in an annular arrangement deflects a laser beam in order to scan a desired plane by the deflected laser beam.

In an optical scanning device of the type described, it has been customary to configure each of the linear diffraction gratings relatively large so that the laser beam may undergo deflection which is great enough for optical scanning. The problem encountered with such prior art configuration of diffraction gratings is that the grating disc as a whole become bulky and the deflection rate of the laser beam is lowered.

SUMMARY OF THE INVENTION

It is therefore an object of the present invention to provide an optical scanning device which allows a larger number of linear diffraction gratings to be arranged on a grating disc in an annular configuration, thereby accomplishing sufficient deflection of a laser beam for optical deflection.

It is another object of the present invention to provide an optical scanning device which promotes reduction of the size of a grating disc and, thereby, fast deflection of a laser beam.

It is another object of the present invention to provide a generally improved optical scanning device.

An optical scanning device for optically scanning a plane to be scanned of the present invention comprises a rotatable grating disc provided with a plurality of linear diffraction gratings in an annular arrangement for deflecting the laser beam which is incident to the grating disc, and a laser beam incidence arrangement for turning the laser beam incident to the grating disc into a parallel beam, providing the parallel beam with an elliptical section in a position of incident on the grating disc, and causing a longer axis of the elliptical section to extend in a radial direction of the grating disc.

In a preferred embodiment of the present invention, the laser beam incidence arrangement comprises a collimating lens.

In another preferred embodiment of the present invention, a laser for emitting the laser beam is provided. A ½ wavelength plate may be provided for rotating an electric field oscillation plane of the laser beam incident thereto from the laser so that a diffraction efficiency of the diffraction gratings becomes maximum.

In another preferred embodiment of the present invention, the longer axis of the elliptical section has a length which is three times a length of a shorter axis of the elliptical section. The longer axis of the elliptical section may have a length which is three times to five times a length of a shorter axis of the elliptical section.

The above and other objects, features and advantages of the present invention will become more apparent from the following description taken with the accompanying drawings.

DESCRIPTION OF THE PREFERRED EMBODIMENT

While the optical scanning device of the present invention is susceptible of numerous physical embodiments, depending upon the environment and requirements of use, a substantial number of the herein shown and described embodiment have been made, tested and used, and all have performed in an eminently satisfactory manner.

Before entering into detailed description of the present invention, a brief reference will now be made to a prior art optical scanning device of the type having a grating disc which is provided with an annular arrangement of linear diffraction gratings to deflect a laser beam to scan a particular plane.

Figure 1:
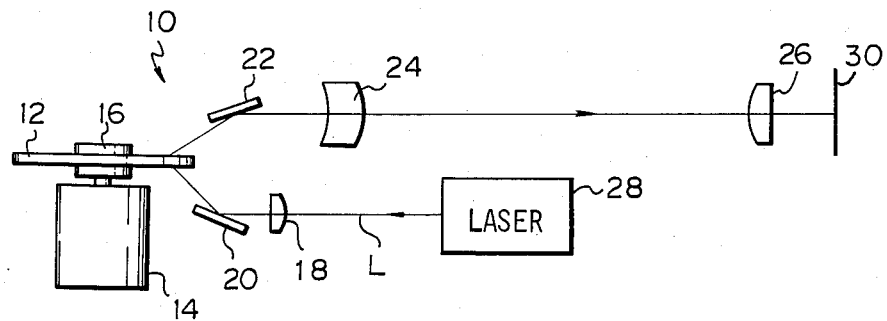
FIGS. 1, 2, 3, 4 and 5 are various views of a prior art optical scanning device.

Referring to FIG. 1, a prior art optical scanning device is shown and generally designated by the reference numeral 10. As shown, the scanning device, or scanner, 10 comprises a hologram grating disc 12 serving as a grating disc, a motor 14 for rotating the grating disc 12, a fixture 16 for mounting the disc 12 on the motor 14, a cylindrical lens 18, flat mirrors 20 and 22, an fθ lens 24, a cylindrical lens 26, and a laser 28 for emitting a laser beam L. The reference numeral 30 designates a specific plane to be scanned by the scanner 10.

Figure 2:
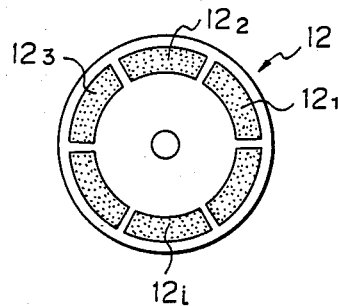

As shown in FIG. 2, the hologram grating disc 12 has a flat circular configuration and comprises a transparent circular substrate made of, for example glass. A plurality of (six in the illustrated case) linear diffraction gratings $12_1$, $12_2$, ..., $12_i$ are provided in an annular arrangement on one of opposite surfaces of the substrate as holograms. The name "hologram grating disc" given to the grating disc 12 originates from the linear diffraction gratings $12_i$ which serve as holograms. The holograms may be surface-relieved holograms, volumetric phase hologram or others. Generally, in grating discs, linear diffraction gratings are sometimes provided in a configuration other than holograms. Hereinafter, the linear diffraction gratings $12_i$ provided as holograms will be referred to as hologram diffraction gratings.

Figure 3:
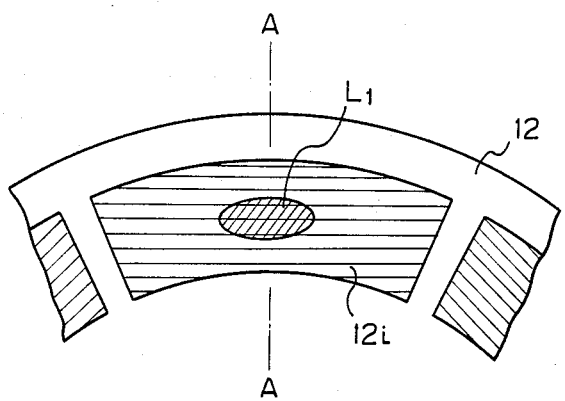

As shown in FIG. 1, the hologram grating disc 12 is mounted on the motor 14 by the fixture 16 to be rotated integrally with the motor 14. The laser beam L radiated by the laser 28 is transmitted through the cylindrical lens 18, and then reflected by the mirror 20 toward the grating disc 12 at a predetermined incidence angle, thereby becoming incident to one of the hologram diffraction gratings $12_i$. Such is schematically shown in FIG. 3. Labeled $L_1$ in FIG. 3 is the section of the incident laser beam L. As shown in FIG. 3, the grating lines of each diffraction grating $12_i$ extend perpendicular to a line A—A which interconnects the center of the diffraction grating $12_i$ and the center of rotation of the disc 12.

When the laser beam L is incident to any of the hologram diffraction gratings $12_i$, that diffraction grating $12_i$ develops diffracted light. As the disc 12 rotates driven by the motor 14, the orientation of the grating lines of the grating 12i relative to the incident laser beam L is varied to in turn vary the direction of the diffracted light along a conical plane which diverges from the position of incidence of the laser beam L. Because all the diffraction gratings 12i on the disc 12 are optically equivalent to each other, deflection of the diffracted light repeats every time the diffraction grating 12i to which the laser beam L is incident is switched from one to another due to the rotation of the disc 12.

As shown in FIG. 1, the diffracted light coming out of the grating 12i is steered by the mirror 22 and then transmitted through the fθ lens 24 and cylindrical lens 26 to be converged in a spot-like configuration in the plane 30. This spot-like point of convergence will hereinafter be referred to as a scanning spot. While the disc 12 is rotated, the scanning spot moves linearly in the plane 30 to thereby main-scan the surface 30. The direction of movement of the scanning spot in the plane 30 will be called the main scan direction, while a direction perpendicular to the main scan direction in the plane 30 will be called the subscan direction. In FIG. 1, the direction perpendicular to the sheet surface corresponds to the main scan direction, and the up-down direction to the subscan direction. Concerning the plane 30, it will be defined by a document or like material when the optical scanning is for reading a document, bar codes or other and by a photoconductive medium when it is for writing optical information.

Figure 4:
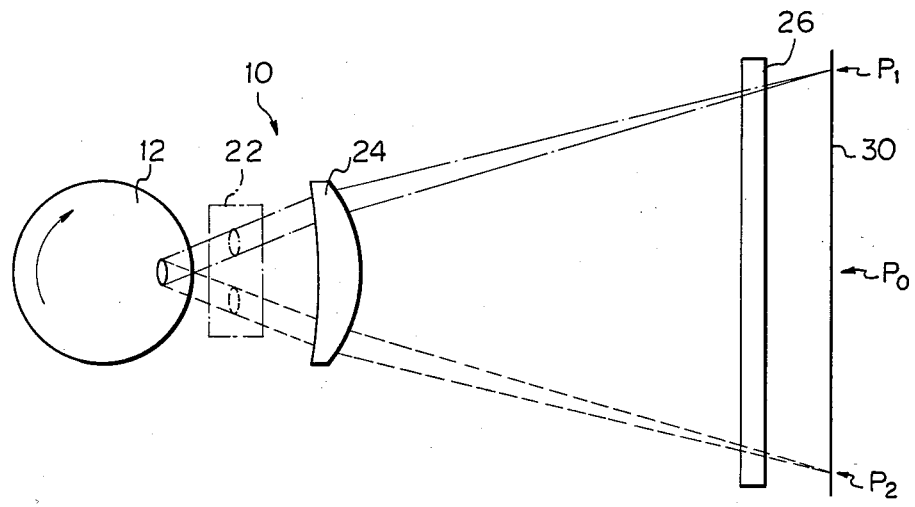

The scanning device 10 discussed above is shown in FIG. 4 in another position as viewed in the subscan direction. As the disc 12 is rotated, the scanning spot provided by the diffracted light in the plane 30 repetitively scans the plane 30 over a given scanning range from a point P1 to a point P2, the center between the points P1 and P2 being labeled P0. At the instant when the scanning spot has aligned with the point P0, the laser beam L is incident to the center of the hologram diffraction grating 12i, as shown in FIG. 3. The laser beam L, as shown in FIG. 1, becomes incident to the disc 12 by way of the cylindrical lens 18 with the result that, as shown in FIGS. 3 and 4, the laser beam L incident to the grating 12i has an elliptical section (Li in FIG. 3) which is longer in the main scan direction than in the subscan direction.

The intention of providing the laser beam L incident to the disc 12 with such an elliptical section, which is comparatively flat in the main scan direction, is as follows.

Where reading a document or writing optical information is implemented by optical scanning, it is the primary requisite that the main scanning line, or the locus of main scanning by the scanning spot, be strictly linear. Since the diffracted light output from the hologram diffraction grating 12i is deflected in such a manner as to draw a conical plane whose apex is defined by the incident point on the disc 12 as mentioned earlier, the incidence angle of the deflected light to the mirror 22 is not constant. Therefore, how to preserve the linearity of the main scanning line with no regard to the changing incidence to the mirror 22 is the problem, and a solution to this problem is conjugatively interrelating the incident point to the disc 12, i.e. the point of development of the diffracted light by the diffracting grating 12i, and the linear main scanning line with respect to the subscan direction. To embody the solution, there is needed an anamorphic optical element such as a cylindrical lens, troidal lens or cylindrical mirror. In FIG. 1, the anamorphic optical element comprises the cylindrical lens 26; the fθ lens 24 (which is a spherical lens) and the cylindrical lens 26 function to conjugatively interrelate the main scanning line and the point of diffracted light development with respect to the subscan direction.

Now, in the case of optical scanning intended to read a document or to write optical information, it is desirable that the scanning spot be in ellipse which is slightly longer in the subscan direction than in the main scan direction in order to promote desirable read scanning or write scanning. The ellipse mentioned above may be 100 microns long in the main scan direction (in the shorter axis direction) and 120 microns long in the subscan direction (longer axis direction), for example. Then, the deflected laser beam coming out of the diffraction grating 12i should be converged by the fθ lens 24 and cylindrical lens 26 to provide the above-mentioned elliptical spot in the plane 30. However, since the cylindrical lens 26 has no power in its lengthwise direction, the lens system made up of the lenses 24 and 26 is not equal in power in the main scan and subscan directions. Should an effort be made to achieve a spot in the desired elliptical configuration in the plane 30 overcoming the difference in power between the main scan and subscan directions, there would necessarily arise the need to cause the laser beam L incident to the disc 12 to be in an ellipse which is flat in the main scan direction, as shown in FIG. 3 or 4.

Specifically, as well known in the art, a laser beam is a Gaussian beam and, when a Gaussian beam is to be converged by an optical system having a predetermined power, the convergence is more enhanced as the beam diameter is increased. Concerning the powers of the lens system shown in FIG. 1 which consists of the fθ lens 24 and cylindrical lens 26, while only the power of the fθ lens 24 acts in the main scan direction, combined powers of the fθ lens 24 and cylindrical lens 26 act in the subscan direction. The composite power, therefore, is greater in the subscan direction than in the main scan direction. Meanwhile, it is rational that the main scanning line be symmetrical with respect to the center (point P0 in FIG. 4). Then, the grating lines of the diffraction grating 12i should unconditionally be parallel to the direction of the longer axis in section of the laser beam when the center of the grating is aligned with the laser mean. The fθ lens 24 is adapted to cause main scanning at a constant rate and is sometimes implemented by an ordinary spherical lens.

Figure 5:
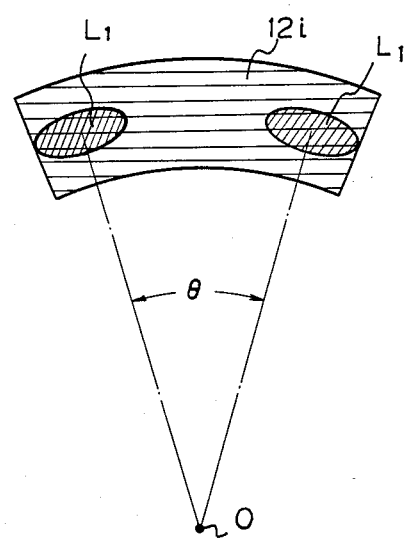

Now, the scanning device 10 described above cannot utilize a single linear diffraction grating 12i on the disc 12 for deflection except for a rotation angle θ of the disc 12 with respect to the center of rotation O, as shown in FIG. 5. That is, inasmuch as the section L1 of the laser beam is an ellipse which is longer in the direction perpendicular to the radial direction of the disc 12, opposite end portions of each linear diffraction grating 12i with respect to the direction of rotation cannot be effectively used for diffraction. It follows that an amount of deflection great enough for optical scanning is unattainable unless every one of the linear diffraction gratings 12i is provided with a substantial size, which makes it difficult to reduce the size of the grating disc 12.

Figure 6A:
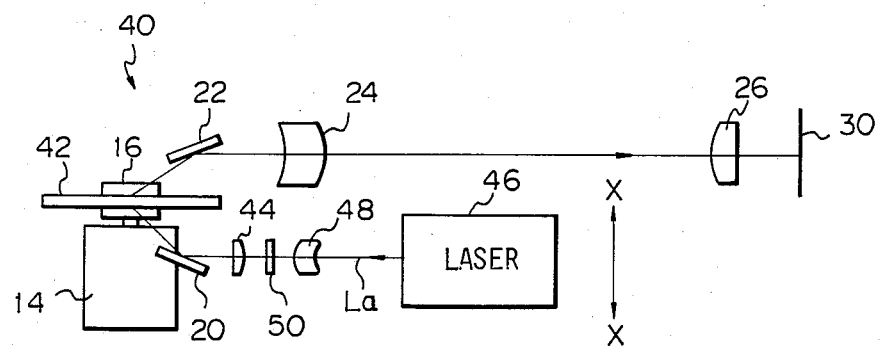
FIG. 6A is a view of an essential part of an optical scanning device embodying the present invention as viewed in a main scan direction.
Figure 6B:
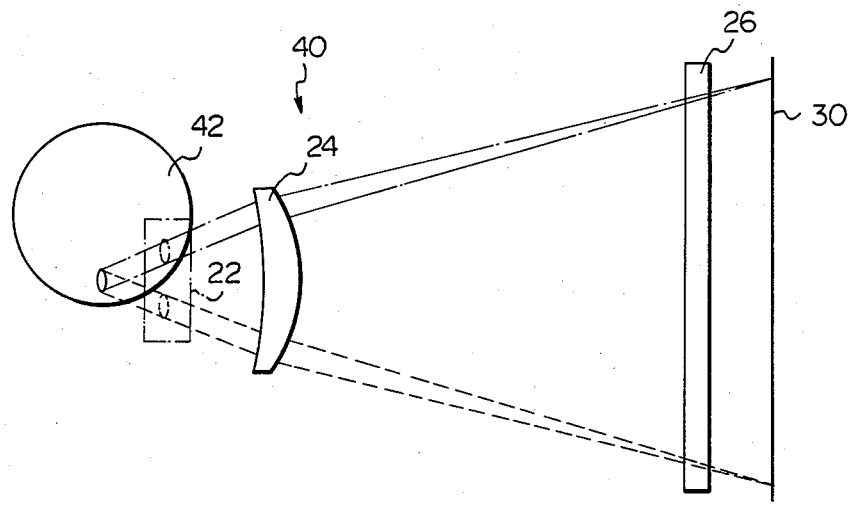
FIG. 6B is a fragmentary view of the scanning device of FIG. 6A as viewed is a subscan direction.

Referring to FIGS. 6A and 6B, an optical scanning device of the present invention which is a solution to the above-discussed problems is shown. In FIGS. 6A and 6B, the same or similar structural elements as those shown in FIG. 1 are designated by like reference numerals for convenience. FIG. 6A shows the device of the present invention, generally 40, in a position as viewed in the main scan direction, while FIG. 6B shows it in another position as viewed in the subscan direction. Structural elements of the device 40 which differ from those of FIG. 1 are a hologram grating disc 42, a cylindrical lens 44, a semiconductor laser 46 for emitting a laser beam La, a collimating lens 48, and a ½ wavelength plate 50.

Figure 7:
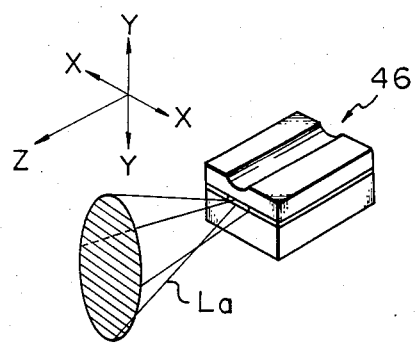
FIGS. 7 and 8 are diagrammatic showings of a characteristic of a semiconductor laser.
Figure 8:
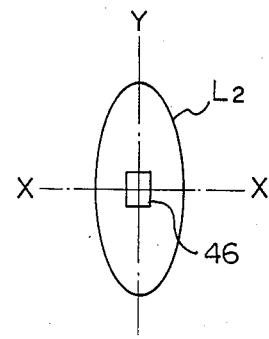

As shown in FIG. 7, the semiconductor laser 46 emits the laser beam La. Assume a direction X which is parallel to the junction of the laser 46 and a direction Y which is perpendicular to the junction, as shown in FIG. 7. The laser beam La advances in a direction Z which is perpendicular to both the directions X and Y. As well known in the art, the laser beam La issuing from the laser 46 is divergent as shown in FIG. 7 and, in addition, the angle of divergence in the direction X differs from one in the direction Y. As shown in FIG. 6A, the laser beam La is turned by the collimating lens 48 into a parallel beam. As shown in FIG. 8, the parallel beam has an elliptical section L2 the longer axis of which extends in the direction Y.

Figure 9:
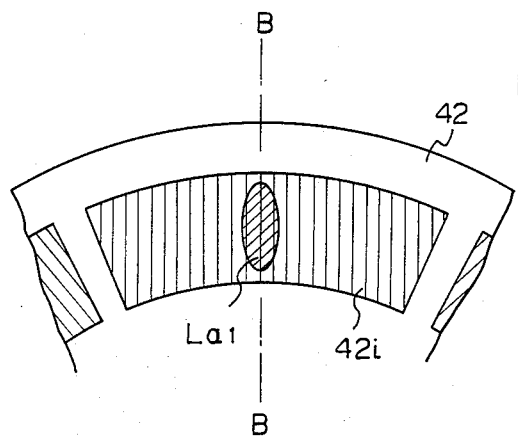
FIG. 9 is a diagrammatic showing of a unique part of the present invention.

The laser 46 is oriented such that the direction X aligns with the up-down direction of the drawing, as shown in FIG. 6A. Therefore, the direction Y aligns with the direction perpendicular to the drawing in FIG. 6A. The laser beam La is sequentially transmitted through the ½ wavelength plate 50 and cylindrical lens 44 and then steered by the flat mirror 20 to become incident to a hologram diffraction grating on the hologram grating disc 42. Such is illustrated in FIG. 9. Labeled La$_1$ in FIG. 9 is a section of the laser beam La in a position of incidence on the diffraction grating 42$_i$.

In order that the scanning spot in the plane 30 may have an elliptical shape which is slightly longer in the subscan direction than in the main scan direction, the longer axis of the elliptical beam section La$_1$ extends parallel to the main scan direction, as will be seen from FIG. 6B. Further, in order that the point of symmetry of the scanning line may align with the center of the scanning range, the grating lines in each of the diffractions gratings 42$_i$ (see FIG. 9) extend in a direction B—B perpendicular to a line which interconnects the center of the diffraction grating and the center of rotation of the disc 42. In this instance, since the diffraction efficiency of the diffraction gratings depends upon the deflection direction of the laser beam, the ½ wavelength plate 50 functions to rotate the electric field oscillation plane of the laser beam La such that the diffraction efficiency becomes maximum. In the section La$_1$ of the laser beam La on the diffraction grating 42$_i$, the flatness of the ellipse is generally such that the longer axis has a length which is at least three to five times the length of the shorter axis.

Figure 10:
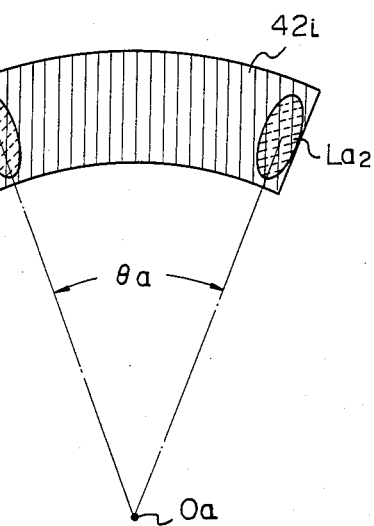
FIG. 10 is a diagrammatic showing of an effect attainable with the present invention.

As described hereinabove, in accordance with the present invention, the laser beam La incident to a hologram diffraction grating 42$_i$ has an elliptical section in the incident position and, in addition, the longer axis of the ellipse extends in the radial direction of the disc 42. Hence, as shown in FIG. 10, a single diffraction grating 42$_i$ can be used as a deflecting element over a rotation angle $\theta$a with respect to the center of rotation Oa of the disc 42, which is a remarkable improvement over the prior art system. This means that assuming the diffraction grating 12$_i$ in the prior art apparatus and the diffraction grating 42$_i$ in the apparatus of the present invention share the same size, the device of the present invention is capable of providing a greater amount of deflection than the prior art device; assuming that they share the same amount of deflection, on the other hand, the device of the present invention is capable of reducing the size of each diffraction grating necessary for providing the deflection over the prior art.

It will thus be seen that the present invention successfully reduces the size of a grating disc, or allows the number of diffraction gratings on a diffraction disc or the amount of deflection to be increased each without entailing an increase in the size of the disc. The decrease in the size of the grating disc turns into a decrease in its inertia performance and, thereby faster deflection of the laser beam.

It will be noted that when optical scanning is used for reading bar codes or other similar purposes, a direction of grating lines in each of diffraction gratings other than one shown in FIG. 9 may be selected because the symmetry of the scanning line is not very critical in that case.

Various modifications will become possible for those skilled in the art after receiving the teachings of the present disclosure without departing from the scope thereof.

What is claimed is:

1. An optical scanning device for optically scanning a plane to be scanned, comprising:
    rotatable grating disc means provided with a plurality of linear diffraction gratings in an annular arrangement for deflecting a laser beam which is incident to said grating disc means; and
    laser beam incidence means for turning the laser beam incident to said grating disc means into a parallel beam, providing the parallel beam with an elliptical section in a position of incident on the grating disc means, and causing a longer axis of the elliptical section to extend in a radial direction of the grating disc means.

2. An optical scanning device as claimed in claim 1, wherein the laser beam incidence means comprises a collimating lens.

3. An optical scanning device as claimed in claim 1, further comprising a laser for emitting the laser beam.

4. An optical scanning device as claimed in claim 3, further comprising a ½ wavelength plate for rotating an electric field oscillation plane of the laser beam incident thereto from the laser so that a diffraction efficiency of the diffraction gratings becomes maximum.

5. An optical scanning device as claimed in claim 1, wherein the longer axis of the elliptical section has a length which is three times a length of a shorter axis of the elliptical section.

6. An optical scanning device as claimed in claim 5, wherein the longer axis of the elliptical section has a length which is three times to five times a length of a shorter axis of the elliptical section.

* * * * *